May 8, 1945.   E. F. FLINT   2,375,356
OPTICAL INSTRUMENT
Filed Sept. 1, 1942
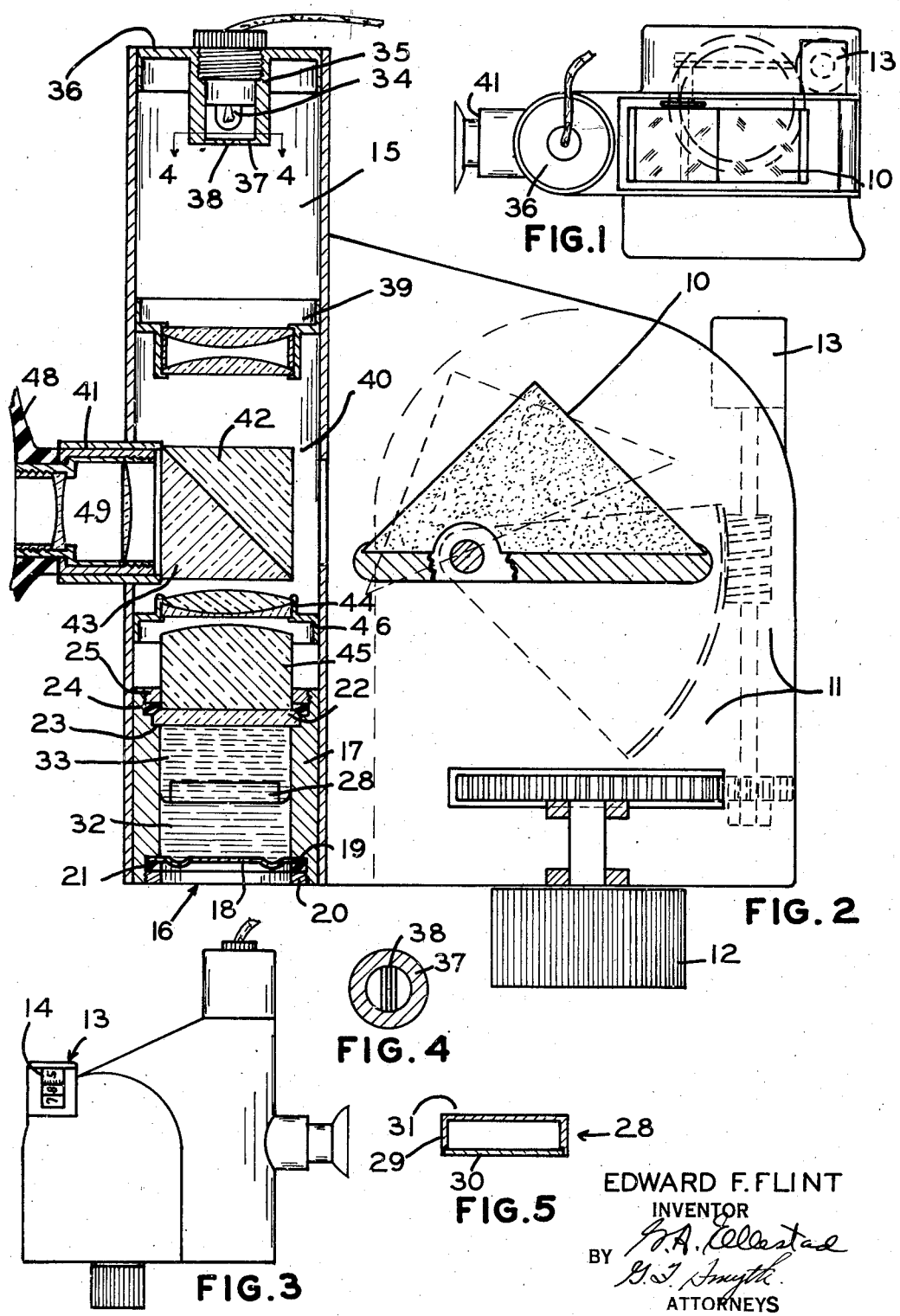
EDWARD F. FLINT
INVENTOR
BY
ATTORNEYS Patented May 8, 1945

2,375,356

UNITED STATES PATENT OFFICE 2,375,356

OPTICAL INSTRUMENT

Edward F. Flint, Rochester, N. Y., assignor to Bausch & Lomb Optical Company, Rochester, N. Y., a corporation of New York Application September 1, 1942, Serial No. 456,889

10 Claims. (Cl. 88—2.2)

This invention relates to optical instruments and more particularly to an instrument having means for defining a datum plane.

Although the instrument has a large number of uses, it is particularly adapted for use as an octant and for the purpose of illustrating the invention, the instrument has been shown as an octant.

It has been long known in the art that a liquid bubble level may be employed to form a datum plane or artificial horizon in conjunction with instruments such as octants wherein it is desirable to correlate the position of a celestial body with respect to the horizon.

In instruments employing a bubble horizon, the bubble has served as the fiducial means, and measurements of the angular elevation of a body have been made by bringing the bubble and the image of the body observed into coincidence. This was sometimes difficult to do, particularly where the observer was a novice and to obviate this difficulty, the fiducial means of the present invention comprise a light slit imaged by the reflecting means. As the fiducial means will be viewed as an elongate index having a length equal to the diameter of the field of the eyepiece, and as accurate measurements will be obtained if the image of the body observed is brought into coincidence with any point along the index, the step of causing the images of the index and celestial body to coincide is made much easier.

The means of the present invention for defining the datum plane comprises a reflecting surface so supported that it will assume a horizontal position regardless of the position of the instrument. In the now preferred form of the present invention, the reflecting surface is carried by a member supported on a liquid carried by a container preferably filled with another liquid immiscible with the liquid supporting the member and having a specific gravity less than that of the member and the supporting liquid. As the member is surrounded by liquid which damps movement of the same, displacement of the member from a mean position will be greatly reduced. Furthermore short period vibrations have very little effect on the member and the effect of short period vibrations can be further reduced by locating the center of gravity of the member below the physical center of the same.

In the now preferred embodiment of the device the width of the member is less than the distance between the opposite surfaces of the wall of the container and the meniscus formed at the adjacent surfaces of the liquids is used to position the member carrying the reflecting surface relative to the wall of the container. The surface tension is sufficient to prevent the member from coming into contact with the wall even though acceleration or deceleration of the aircraft tends to cause a displacement of the member.

An octant formed in accordance with my invention is easier to produce and less costly than the bubble type octant, for it is not necessary to employ any costly ground surfaces such as the meniscus of the bubble cell. Furthermore, as the fiducial means is actually a light slit imaged by the reflector, no elaborate means is necessary to produce a dark field illumination.

Other objects and advantages of the present invention will appear from the following description taken in connection with the acompanying drawing in which:

Fig. 1 is a top plan view of an octant constructed in accordance with the present invention.

Fig. 2 is a vertical section of the octant.

Fig. 3 is a side elevation of the octant.

Fig. 4 is a section on line 4—4 of Fig. 2.

Fig. 5 is a vertical section of the member carrying the reflecting surface of the present invention.

The device of the present invention, for the purpose of illustration, has been shown as an octant and in the now preferred form comprises an index reflector 10, the angular position of which is adjustable through a suitable gear train indicated generally at 11 and an adjusting knob 12. The position of the reflector 10 is indicated by a suitable register 13 having a window 14 through which the indications of the register are visible.

The casing of the instrument includes a tube 15 carrying at one end thereof a cell 16 closing the end of the tube. The cell comprises a tubular body 17, the one end of which is closed and sealed by a corrugated flexible wall 18 held in position on an annular seat 19 by a clamping ring 20 threaded into the end of the body 17. A gasket 21 clamped between the wall 18 and the seat 19 seals the jointure between the same. The opposite end of the cell is closed and sealed by a transparent wall 22 secured in place on an internally formed annular seat 23 by a gasket 24 and a locking ring 25.

The cell carries the reflecting surface of the device of the present invention and as now preferred, the surface is formed by evaporating chromium on the exterior surface of one wall of a small shell 28, here shown as cylindrical in shape. The shell 28, as best shown in Fig. 5, comprises a cylindrical cup-shaped member 29, the one open end thereof being closed by a circular plate 30 of a different material than that used to form the member 29. The reflecting surface 31 is formed on the exterior surface of the wall of the shell opposite to the wall formed by the plate 30. The shell 28 is supported within the cell 16 on a liquid 32, which in the now preferred form of the invention is completely filled with a second liquid 33 immiscible with and having a lower specific gravity than the supporting liquid 32. The specific gravity of the shell 28 should be less than the specific gravity of the liquid 32 and slightly greater but not less than the specific gravity of the liquid 33.

So that light rays emanating from a point exterior to the cell 16 may enter the same to be reflected by the reflecting surface 31, liquid 33 in the embodiment of the invention illustrated, is transparent and preferably has an index of refraction equal to that of the transparent wall 22.

It is now preferred to select a supporting liquid which will wet the wall of the cell 16 and form a concave meniscus, as the meniscus is used in the present invention to center the shell 28 relative to the wall of the cell. It will be seen, referring to Fig. 2, that if the diameter of the shell is somewhat less than the interior diameter of the cell, the meniscus formed by the liquid 32 will be sufficient to hold the shell away from the wall of the cell and center the same relative to the vertical axis of the tube 15.

As the device is to be used as an octant and will be carried within an aircraft to altitudes at which the temperature is below freezing of water, both liquids should be ones which have a low freezing point. The flexible wall 19 will allow some expansion and contraction of the liquids contained within the cell but preferably liquids should be used which have a relatively low coefficient of expansion. Although a large number of liquids may be used, I have found that a mixture of kerosene and gasoline is sufficiently limpid to be used as the transparent liquid. Ethylene glycol, as it is immiscible with the mixture of kerosene and gasoline and denser, may be used as the supporting liquid.

As the plate 30 is of different material than the member 29, the center of gravity of the shell can be determined by the material used to form the plate 30. It is now preferred to form the plate of a heavier material so that the center of gravity of the shell will be lower than the physical center of the same. With the center of gravity of the member lying below the physical center of the same, the shell will tend to maintain a position in which the reflecting surface faces the transparent wall of the cell. If the shell should become inverted in use it can be quickly righted by merely oscillating the instrument a few times. The placing of the center of gravity at a point below that of the actual center of the member also reduces the effect of short period vibrations and the member tends to maintain an equilibrium in a horizontal plane even though the instrument is subject to such vibrations.

The fiducial means may comprise any means desired and in the now preferred form of the invention this means comprises a light source such as an incandescent lamp 34 mounted in a shield 35 carried by a transverse wall 36 closing the end of the tube 15 opposite the cell 16. The end of the shield is formed with a diaphragm 37 having an elongated opening or slit 38 therein and through which light rays from the lamp 34 pass to a projecting system 39 mounted within the tube 15.

A light dividing means 40, disposed within the tube 15 at its junction with a sight tube 41 entering the tube 15 normal thereto comprises, as shown in Fig. 2, a pair of right angle upper and lower prisms 42 and 43 cemented together at their hypotenuse. The joining surfaces of the prisms are coated so as to reflect as well as transmit light. The slit 38 is projected by the projection system 39 through the light divider 40 and is imaged in a plane somewhat above that of the reflecting surface 31. A lens system comprising a pair of lenses 44 and 45 is mounted within the tube 15 intermediate the light divider 40 and the cell 16. The lens 45 has a plane surface which is cemented to the exposed portion of the wall 22 while lens 44 is mounted within the tube by any type of mounting desired such as the bezel ring 46. This lens system to some extent changes the position of the image projected by system 39 although the slit is imaged in a plane above that of the reflecting surface 31.

It is desirable to have the image of the slit 38 appear at infinity to an observer, as the image of the observed body appears at infinity, and to have the image move at the same speed and direction as the image of the observed body when the instrument is tilted in vertical measurement plane. The index of refraction of the lens system 44 and 45 and the optical surfaces thereof should be such relative to the index of refraction of the liquid 33, and, the reflecting surface 31 disposed at such a distance from the principal plane of the lens system, that the reflected real image of the slit 38 is projected by system 44 and 45 to infinity and at an angle to the longitudinal axis of the tube 15 equal to half the angle of reflection. That is, exit rays after refraction by the system 44 and 45 are parallel and emerge at an angle equal to the angular displacement of the image of the body when the instrument is tilted in the plane of measurement.

The tube 15 is formed with an opening leading to the portion of the casing housing the index reflector 10 so that light rays from the observed body are brought into the sight tube 41 as the light divider 40 directs the image of the reflected slit through the sight tube 41 and to the eye of the observer held against the guard 48.

It is now preferred to form the slit 38 of such a length that the observed image thereof, when the instrument is held level, will just fill the eyepiece of the instrument at its greatest width. Thus the position of the image of the slit relative to the field of the eyepiece will indicate the position in which the instrument is being held.

Where it is desired to magnify the image of the observed body, a Galilean telescope 49 may be disposed within the sight tube 41.

In the use of the device of the present invention, an observer by holding his eye against the guard 48 will by adjustment of the knob 12 be able to rotate the index reflector 10 so as to bring the image of the observed body into coincidence with the image of the slit 38 and as the register 13 is calibrated to show the angular position of the reflector 10 in terms of angular elevation, the reading of the register 13 will show the angular elevation of the celestial body.

There are no optical surfaces in the device of the present invention which require great skill in forming, and the same can be manufactured at a smaller cost than many of the heretofore proposed octants using a bubble horizon.

The device of the present invention, as the fiducial means or index is an illuminated line and correct measurements can be made by bringing the image of the celestial body into coincidence with any portion of the illuminated line, is less difficult for a novice to use with accurate results. For this reason an octant such as herein described can be used to train observers as it is easier to bring the image of the observed body into coincidence with the artificial horizon than instruments employing a bubble horizon.

While one embodiment of the invention has been disclosed, it is understood that the invention need not be limited to the device as described but is susceptible of modifications falling within the spirit of the invention and the scope of the appended claims.

I claim:

1. In an optical instrument, the combination of a cell containing a liquid; a closed hollow member supported on the surface of the liquid; reflecting means carried on the upper surface of said member; means on the lower portion of said member for fixing the center of gravity thereof lower than the physical center so that said hollow member will resist movement about said physical center; and fiducial means fixed relative to said cell and in optical alignment with said reflecting means of said member whereby an image of the fiducial means is reflected by the reflecting means.

2. In an optical instrument, the combination of a cell having a side wall and a transparent end wall; two immiscible liquids in the cell, said liquids having different specific gravities and the liquid adjacent the transparent wall being transparent; a member supported on the surface of the heavier liquid, the upper surface of the heavier liquid having an up-curved meniscus where it contacts the side wall of the cell, said member being of such a size and shape relative to the size and shape of said cell that the meniscus spaces the member from the wall of the cell, the lighter liquid acting to damp the movement of the member; reflecting means carried by said member and immersed in said transparent liquid; and fiducial means in optical alignment with the reflecting means whereby an image of the fiducial means may be reflected by the reflecting means.

3. In an optical instrument, the combination of a cell having a transparent wall portion; two immiscible liquids of different specific gravities carried by said cell, at least one of said liquids being transparent and normally carried adjacent said transparent wall portion; a member having a specific gravity less than the heavier of said liquids and greater than the lighter of said liquids, said member being supported on the heavier liquid, movements of said member being damped by the lighter liquid surrounding said member; reflecting means carried by said member; means on said member for maintaining the center of gravity of the same in such a position relative to said reflecting means that said means will tend to remain in a position wherein light rays may pass through said transparent wall portion and liquid to said reflecting means; and fiducial means positioned in optical alignment with said cell whereby an image of the fiducial means is reflected by the reflecting means.

4. In an optical instrument for measuring the angular elevation of a distant object; a casing comprising a tube; a cell positioned at one end of said tube; a transparent end closing wall for said cell facing the opposite end of said tube; two immiscible liquids of different specific gravities contained within said cell, at least one of said liquids being transparent and contained within said cell adjacent the transparent wall thereof; a reflecting member supported on the heavier of said liquids and facing the transparent wall of said cell; fiducial means fixed in said tube at the end opposite said cell; a light-dividing means positioned in said tube intermediate the ends thereof and transversely of the optical axis connecting the fiducial means and said reflecting means; eyepiece means positioned laterally of the light-dividing means; an adjustable reflecting means for reflecting light rays from a distant object through said light-dividing means to said eyepiece means; and a lens system intermediate said light-dividing means and said transparent wall for projecting the image of fiducial means to infinity whereby the images of said object and fiducial means appear to be on the same plane to an observer.

5. In an instrument of the type described, a casing; an eyepiece; an index reflector pivotally mounted on said casing for reflecting light rays from a distant object into said eyepiece; a cell having a transparent wall portion fixed in said casing; two immiscible liquids of different specific gravities carried within said cell; a member supported by the heavier of said liquids; a reflecting surface carried by said member, said surface facing the transparent wall portion of said cell, at least one of said liquids being transparent and normally carried within said cell intermediate the reflecting surface and said transparent wall portion; an illuminated fiducial means fixed in said casing and in optical alignment with said reflecting surface whereby rays from said fiducial means will pass into said cell and be reflected out by said surface; and means in the path of the reflected rays for directing the same into said eyepiece.

6. In an instrument of the type described, a casing; an eyepiece; an index reflector pivotally mounted on said casing for reflecting light rays from a distant object into said eyepiece; a cell having a transparent wall portion fixed in said casing; two immiscible liquids of different specific gravities carried within said cell; a member supported by the heavier of said liquids; a reflecting surface carried by said member, said surface facing the transparent wall portion of said cell, at least one of said liquids being transparent and normally carried within said cell intermediate the reflecting surface and said transparent wall portion; a light source mounted in said casing in alignment with said reflecting surface; a diaphragm having an elongate opening therein fixed intermediate the light source and said reflecting surface whereby rays passing through said opening will pass into said cell and be reflected out by said surface; and means in the path of the reflected rays for directing the same into said eyepiece whereby an observer may simultaneously view the images of said illuminated opening and the distant object.

7. In an instrument of the type described, a casing; an eyepiece; an index reflector pivotally mounted on said casing for reflecting light rays from a distant object into said eyepiece; a cell having a transparent wall portion fixed in said casing; two immiscible liquids of different specific gravities carried within said cell; a member supported by the heavier of said liquids; a reflecting surface carried by said member, said surface facing the transparent wall portion of said cell, at least one of said liquids being transparent and normally carried within said cell intermediate the reflecting surface and said transparent wall portion; a light source mounted in said casing in alignment with said reflecting surface; a diaphragm fixed intermediate said reflecting surface and said light source, said diaphragm having an elongate opening formed therein whereby rays passing through said opening will pass into said cell and be reflected out by said surface; and means in the path of the reflected rays for directing the same into said eyepiece, the opening of said diaphragm being of such a size relative to the size of said eyepiece that the image of said opening as viewed by said eyepiece will extend substantially the entire width of the field of said eyepiece.

8. In an instrument for measuring the angular elevation of a distant object above the horizontal, a casing; an eyepiece; an index reflector pivotally mounted on said casing for reflecting light rays from a distant object into said eyepiece; a cell having a transparent wall portion fixed in said casing; two immiscible liquids of different specific gravities completely filling said cell, at least one of said liquids being transparent and normally carried within said cell adjacent the transparent wall portion thereof; a member supported by the heavier of said liquids; a reflecting surface so formed on said member that said surface faces said transparent liquid; an alluminated fiducial means fixed in said casing and in optical alignment with said reflecting surface whereby light rays entering said cell are reflected out by said surface; means in the path of the reflected rays for directing the same into said eyepiece; and lens means intermediate said reflecting surface and said light ray directing means, said lens means being so spaced from said reflecting surface and being so formed that the same projects the reflected rays to infinity and at an angle to the optical axis thereof equal to half the angle of reflection.

9. An optical instrument comprising a housing; a container having a transparent wall portion mounted in said housing; two immiscible liquids of different specific gravities carried by and completely filling said container, at least one of said liquids being transparent and normally carried within said container adjacent said wall portion; a member supported by the heavier of said liquids, the surface tension at the interface of said liquids holding said member out of contact with the wall of said container; a reflecting surface carried by said member and visible through said transparent liquid and said transparent wall portion from a position externally of said container; and fiducial means carried by said housing and disposed in alignment with said transparent wall portion so that light rays therefrom passing through said transparent wall portion and said transparent liquid will be reflected out of said container by said reflecting surface.

10. An optical instrument comprising a housing; a container having a transparent wall portion mounted in said housing; two immiscible liquids of different specific gravities completely filling said container, the lighter of said liquids being transparent and normally disposed adjacent said transparent wall portion; a member having a substantially flat lower surface contacting the upper surface of the heavier of said liquids and supported thereby, the surface tension at the interface of said liquids holding said member away from the wall of the container; a reflecting surface carried by said member and facing said transparent wall portion; fiducial means carried by said housing and so positioned relative to said container that light rays from said fiducial means passing through said transparent wall portion and transparent liquid will be reflected out of said container by said reflecting surface; eyepiece means; light directing means positioned in said housing in the path of said reflected light rays and adapted to direct said light rays to said eyepiece means; and means for directing light rays from a distant object to said eyepiece means whereby an observer may see an image of said object and the reflected image of the fiducial means in the field of the eyepiece means.

EDWARD F. FLINT.